(12) United States Patent
Kwon et al.

(10) Patent No.: US 8,374,565 B2
(45) Date of Patent: Feb. 12, 2013

(54) ANTENNA DIVERSITY RECEIVER

(75) Inventors: Yong Il Kwon, Gyunggi-do (KR);
Myeung Su Kim, Gyunggi-do (KR);
Tah Joon Park, Gyunggi-do (KR)

(73) Assignee: Samsung Electro-Mechanics Co., Ltd.,
Gyunggi-do (KR)

( * ) Notice: Subject to any disclaimer, the term of this patent is extended or adjusted under 35 U.S.C. 154(b) by 1223 days.

(21) Appl. No.: 12/188,871

(22) Filed: Aug. 8, 2008

(65) Prior Publication Data

US 2009/0170461 A1 Jul. 2, 2009

(30) Foreign Application Priority Data

Dec. 29, 2007 (KR) ........................ 10-2007-0141092

(51) Int. Cl.
*H04B 1/06* (2006.01)

(52) U.S. Cl. .................................. 455/277.1; 455/277.2

(58) Field of Classification Search ............... 455/277.1, 455/277.2
See application file for complete search history.

(56) References Cited

U.S. PATENT DOCUMENTS

| | | | | |
|---|---|---|---|---|
| 5,940,452 A * | 8/1999 | Rich | | 375/347 |
| 6,032,033 A * | 2/2000 | Morris et al. | | 455/277.2 |
| 7,010,270 B1 * | 3/2006 | Thomas et al. | | 455/67.13 |
| 7,149,489 B2 * | 12/2006 | Hong | | 455/269 |
| 7,515,893 B2 * | 4/2009 | Lyons et al. | | 455/277.2 |
| 7,729,317 B2 * | 6/2010 | Payne et al. | | 370/334 |
| 8,121,572 B2 * | 2/2012 | Lin et al. | | 455/232.1 |
| 2002/0004375 A1 * | 1/2002 | Spencer et al. | | 455/277.1 |
| 2002/0055345 A1 * | 5/2002 | Wood, Jr. | | 455/277.1 |
| 2002/0058488 A1 * | 5/2002 | Miyahara | | 455/277.2 |
| 2003/0125078 A1 * | 7/2003 | Hong | | 455/556 |
| 2004/0212401 A1 * | 10/2004 | Chien | | 327/58 |
| 2005/0090204 A1 * | 4/2005 | Chien | | 455/67.11 |
| 2005/0191978 A1 * | 9/2005 | Spencer et al. | | 455/132 |
| 2005/0197086 A1 * | 9/2005 | Ogawa et al. | | 455/277.1 |
| 2005/0250543 A1 * | 11/2005 | Thermond | | 455/562.1 |
| 2005/0272384 A1 * | 12/2005 | Kogure | | 455/134 |
| 2006/0089117 A1 * | 4/2006 | Suzuki | | 455/269 |
| 2007/0111673 A1 * | 5/2007 | Otaka et al. | | 455/76 |
| 2008/0009671 A1 * | 1/2008 | Kimoto et al. | | 600/109 |
| 2008/0112466 A1 * | 5/2008 | Sasaki | | 375/135 |
| 2008/0318540 A1 * | 12/2008 | Homan et al. | | 455/277.1 |

* cited by examiner

*Primary Examiner* — Nay A Maung
*Assistant Examiner* — Erica Fleming-Hall
(74) *Attorney, Agent, or Firm* — Lowe Hauptman Ham & Berner, LLP

(57) ABSTRACT

An antenna diversity receiver includes a plurality of antennas, an antenna selector unit, an RF module unit, a logic gate unit, a power detector unit, and a selection controller unit. The antenna selector unit selects one of the antennas. The RF module unit converts an RF RX signal received from the antenna selector unit into a baseband RX signal. The logic gate unit controls a power detection mode for detecting the power levels of RX signals and an operation mode for selecting one of the antennas. The power detector unit detects the power level of the RX signal. The selection controller unit controls the antenna selector unit to sequentially select the antennas in the power detection mode, and controls the antenna selector unit to select the antenna with a relatively good RX sensitivity among the antennas.

12 Claims, 5 Drawing Sheets

ANTENNA DIVERSITY RECEIVER

CROSS-REFERENCE TO RELATED APPLICATIONS

This application claims the priority of Korean Patent Application No. 2007-141092 filed on Dec. 29, 2007, in the Korean Intellectual Property Office, the disclosure of which is incorporated herein by reference.

BACKGROUND OF THE INVENTION

1. Field of the Invention

The present invention relates to an antenna diversity receiver applicable to an orthogonal frequency division multiplexing (OFDM) system, and more particularly, to an antenna diversity receiver that can reduce power consumption by detecting the power of a receive (RX) signal at a front end of an analog-to-digital (A/D) converter, i.e., a radio frequency (RF) module unit, and can further reduce the power consumption by determining a wake-up mode at the RF module unit according to the power of an RX signal.

2. Description of the Related Art

Generally, in a radio frequency (RF) receiver, the strength of a receive (RX) signal varies with time due to indoor multipath fading. In order to improve an RX sensitivity by removing the time-dependent multipath fading, the RF receiver uses a frequency diversity scheme and a space diversity scheme.

An example of an antenna diversity receiver using an antenna diversity scheme corresponding to the space diversity scheme will be described with reference to FIG. 1.

FIG. 1 is a block diagram of a related art antenna diversity receiver.

Referring to FIG. 1, the related art antenna diversity receiver includes first and second antennas ANT1 and ANT2, an antennal selector unit 10, an RF module unit 20, an A/D converter 30, a power detector 50, and a selection controller unit 60. The antenna selector unit 10 selects one of the first and second antennas ANT1 and ANT2. The RF module unit 20 converts an RF RX signal received from the antenna selector unit 10 into a baseband RX signal. The A/D converter 30 converts the RX signal received from the RF module unit 20 into a digital signal. Using the digital signal received from the A/D converter 30, the power detector 50 detects the power of an RX signal received through each of the first and second antennas ANT1 and ANT2. According to the power level detected by the power detector 50, the selection controller unit 60 selects the antenna with a relatively high RX power.

The RF module unit 20 includes a low-noise amplifier (LNA) 21, a mixer 22, a band-pass filter (BPF) 23, and a variable-gain amplifier (VGA) 24. The low-noise amplifier 21 low-noise amplifies the RF RX signal received from the antenna selector unit 10. The mixer 22 converts the RF RX signal received from the low-noise amplifier 21 into a baseband RX signal. The band-pass filter 23 passes an RX signal of a predetermined band among the RX signals received from the mixer 22. The variable-gain amplifier 24 amplifies the signal received from the band-pass filter 23.

In this way, the related art antenna diversity receiver uses the A/D converter 30 to analyze and compare the strengths of the signals received from the RF module unit 20, thereby selecting the antenna with a high RX signal strength.

However, in the related art antenna diversity receiver illustrated in FIG. 1, the low-noise mixer 21, mixer 22, band-pass filter 23, and variable-gain amplifier 24 of the RF module unit 20 and the A/D converter 30 must be all operated in order to select the antenna with a good RX sensitivity among the first and second antennas ANT1 and ANT2, thus causing large power consumption.

SUMMARY OF THE INVENTION

An aspect of the present invention provides an antenna diversity receiver that can reduce power consumption by detecting the power of a receive (RX) signal at a front end of an analog-to-digital (A/D) converter, i.e., a radio frequency (RF) module unit, and can further reduce the power consumption by determining a wake-up mode at the RF module unit according to the power of an RX signal.

According to an aspect of the present invention, there is provided an antenna diversity receiver including: a plurality of antennas; an antenna selector unit selecting one of the antennas; an RF module unit converting an RF receive (RX) signal received from the antenna selector unit into a baseband RX signal; a logic gate unit controlling a power detection mode for detecting the power levels of RX signals received through the antennas and an operation mode for selecting one of the antennas on the basis of the detected power; a power detector unit detecting the power level of the RX signal received through each of the antennas, on the basis of the RX signal received through the RF module unit, under the control of the logic gate unit; and a selection controller unit controlling the antenna selector unit to sequentially select the antennas in the power detection mode and controlling the antenna selector unit to select the antenna with a relatively good RX sensitivity among the antennas in the operation mode on the basis of the power levels detected by the power detector unit, under the control of the logic gate unit.

The RF module unit may include: a low-noise amplifier low-noise-amplifying the RF RX signal received from the antenna selector unit; a mixer converting the RF RX signal received from the low-noise amplifier into a baseband RX signal; a band-pass filter passing an RX signal of a predetermined band among the RX signals received from the mixer; and a variable-gain amplifier amplifying the signal received from the band-pass filter.

The power detector unit may detect the power level of the RX signal received through each of the antennas, on the basis of the RX signal output from the band-pass filter of the RF module unit.

The antennas may include a first antenna and a second antenna, and the antenna selector unit may include: a first antenna switch configured to select the first antenna under the control of the selection controller unit; and a second antenna switch configured to select the second antenna under the control of the selection controller unit.

The logic gate unit may generate, in the power detection mode, first and second clock signals, which are used to detect the power level of the RX signal received through the first antenna, and third and fourth clock signals, which are used to detect the power level of the RX signal received through the second antenna, to output the first and second clock signals and the third and fourth clock signals to the power detector unit; may generate, in the power detection mode, a fifth clock signal, which is used to select the first antenna or the second antenna, to output the fifth clock signal to the selection controller unit; and may generate a mode selection signal, which is used to select the fifth clock signal in the power detection mode and to select the output signal of the power detector unit in the operation mode, to output the mode selection signal to the selection controller unit.

The power detector unit may include: a rectifier unit rectifying a signal received from the band-pass filter; a first capacitor connected between a ground terminal and an output terminal of the rectifier unit to be charged with a voltage corresponding to a signal received through the first antenna; a second capacitor connected between the ground terminal and the output terminal of the rectifier unit in parallel to the first capacitor to be charged with a voltage corresponding to a signal received through the second antenna; and a comparator comparing a first detection voltage charged in the first capacitor with a second detection voltage charged in the second capacitor, to output a comparison result signal with regard to the first detection voltage and the second detection voltage.

The power detector unit may further include: a first charge switch connected between the first capacitor and the output terminal of the rectifier unit to switch a charge path of the first capacitor in response to the first clock signal of the logic gate unit; a second charge switch connected between the second capacitor and an output terminal of the band-pass filter to switch a charge path of the second capacitor in response to the third clock signal of the logic gate unit; a first discharge switch connected in parallel to the both ends of the first capacitor to switch a discharge path of the first capacitor in response to the second clock signal of the logic gate unit; and a second discharge switch connected in parallel to the both ends of the second capacitor to switch a discharge path of the second capacitor in response to the fourth clock signal of the logic gate unit.

The selection controller unit may select and provide the fifth clock signal received from the logic gate unit to the antenna selector unit in response to the mode selection signal of the logic gate unit in the power detection mode; and may provide a power level signal detected by the power detector unit to the antenna selector unit in response to the mode selection signal in the operation mode.

In the power detection mode, when the fifth clock signal is used to select the first antenna, the logic gate unit may use the first and second clock signals to control the first charge switch/the first discharge switch to be off/on for discharge of the first capacitor, and then may use the first and second clock signals to control the first antenna switch/the first charge switch/the first discharge switch to be on/on/off for detection of the first detection voltage through charge of the first capacitor.

In the power detection mode, when the fifth clock signal is used to select the second antenna, the logic gate unit may use the third and fourth clock signals to control the second charge switch/the second discharge switch to be off/on for discharge of the second capacitor, and then may use the third and fourth clock signals to control the second antenna switch/the second charge switch/the second discharge switch to be on/on/off for detection of the second detection voltage through charge of the second capacitor.

If the first detection voltage is higher than the second detection voltage, the power detector unit may output a signal for selection of the first antenna; and if the first detection voltage is not higher than the second detection voltage, the power detector unit may output a signal for selection of the second antenna.

In the operation mode, the logic gate unit may select and provide an output signal of the power detector unit to the first and second antenna switches of the antenna selector unit, so that on the basis of the output signal of the power detector unit, the logic gate unit controls the first antenna switch to select the first antenna if the first detection voltage is higher than the second detection voltage, and controls the second antenna switch to select the second antenna if the first detection voltage is not higher than the second detection voltage.

According to another aspect of the present invention, there is provided an antenna diversity receiver including: a plurality of antennas; an antenna selector unit selecting one of the antennas; an RF module unit converting an RF receive (RX) signal received from the antenna selector unit into a baseband RX signal; a logic gate unit controlling a power detection mode for detecting the power levels of RX signals received through the antennas and an operation mode for selecting one of the antennas on the basis of the detected power; a power detector unit detecting the power level of the RX signal received through each of the antennas, on the basis of the RX signal received through the RF module unit, under the control of the logic gate unit; a selection controller unit controlling the antenna selector unit to sequentially select the antennas in the power detection mode and controlling the antenna selector unit to select the antenna with a relatively good RX sensitivity among the antennas in the operation mode on the basis of the power levels detected by the power detector unit, under the control of the logic gate unit; and a wake-up determiner unit determining whether the power level detected by the power detector unit is higher than a predetermined wake-up power level, and outputting a wake-up signal if the detected power level is higher than the predetermined wake-up power level.

The RF module unit may include: a low-noise amplifier low-noise-amplifying the RF RX signal received from the antenna selector unit; a mixer converting the RF RX signal received from the low-noise amplifier into a baseband RX signal; a band-pass filter passing an RX signal of a predetermined band among the RX signals received from the mixer; and a variable-gain amplifier amplifying the signal received from the band-pass filter.

The power detector unit may detect the power level of the RX signal received through each of the antennas, on the basis of the RX signal output from the band-pass filter of the RF module unit.

The antennas may include a first antenna and a second antenna, and the antenna selector unit may include: a first antenna switch configured to select the first antenna under the control of the selection controller unit; and a second antenna switch configured to select the second antenna under the control of the selection controller unit.

The logic gate unit may generate, in the power detection mode, first and second clock signals, which are used to detect the power level of the RX signal received through the first antenna, and third and fourth clock signals, which are used to detect the power level of the RX signal received through the second antenna, to output the first and second clock signals and the third and fourth clock signals to the power detector unit; may generate, in the power detection mode, a fifth clock signal, which is used to select the first antenna or the second antenna, to output the fifth clock signal to the selection controller unit; and may generate a mode selection signal, which is used to select the fifth clock signal in the power detection mode and to select the output signal of the power detector unit in the operation mode, to output the mode selection signal to the selection controller unit.

The power detector unit may include: a first capacitor connected between a ground terminal and an output terminal of the rectifier unit to be charged with a voltage corresponding to a signal received through the first antenna; a second capacitor connected between the ground terminal and the output terminal of the rectifier unit in parallel to the first capacitor to be charged with a voltage corresponding to a signal received through the second antenna; and a comparator comparing a first detection voltage charged in the first capacitor with a second detection voltage charged in the second capacitor, to output a comparison result signal with regard to the first detection voltage and the second detection voltage.

The power detector unit may further include: a rectifier unit rectifying a signal received from the band-pass filter; a first charge switch connected between the first capacitor and the output terminal of the rectifier unit to switch a charge path of the first capacitor in response to the first clock signal of the logic gate unit; a second charge switch connected between the second capacitor and an output terminal of the band-pass filter to switch a charge path of the second capacitor in response to the third clock signal of the logic gate unit; a first discharge switch connected in parallel to the both ends of the first capacitor to switch a discharge path of the first capacitor in response to the second clock signal of the logic gate unit; and a second discharge switch connected in parallel to the both ends of the second capacitor to switch a discharge path of the second capacitor in response to the fourth clock signal of the logic gate unit.

The selection controller unit may select and provide the fifth clock signal received from the logic gate unit to the antenna selector unit in response to the mode selection signal of the logic gate unit in the power detection mode; and may provide a power level signal detected by the power detector unit to the antenna selector unit in response to the mode selection signal in the operation mode.

In the power detection mode, when the fifth clock signal is used to select the first antenna, the logic gate unit may use the first and second clock signals to control the first charge switch/the first discharge switch to be off/on for discharge of the first capacitor, and then may use the first and second clock signals to control the first antenna switch/the first charge switch/the first discharge switch to be on/on/off for detection of the first detection voltage through charge of the first capacitor.

In the power detection mode, when the fifth clock signal is used to select the second antenna, the logic gate unit may use the third and fourth clock signals to control the second charge switch/the second discharge switch to be off/on for discharge of the second capacitor, and then may use the third and fourth clock signals to control the second antenna switch/the second charge switch/the second discharge switch to be on/on/off for detection of the second detection voltage through charge of the second capacitor.

If the first detection voltage is higher than the second detection voltage, the power detector unit may output a signal for selection of the first antenna; and if the first detection voltage is not higher than the second detection voltage, the power detector unit may output a signal for selection of the second antenna.

In the operation mode, the logic gate unit may select and provide an output signal of the power detector unit to the first and second antenna switches of the antenna selector unit, so that on the basis of the output signal of the power detector unit, the logic gate unit controls the first antenna switch to select the first antenna if the first detection voltage is higher than the second detection voltage, and controls the second antenna switch to select the second antenna if the first detection voltage is not higher than the second detection voltage.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
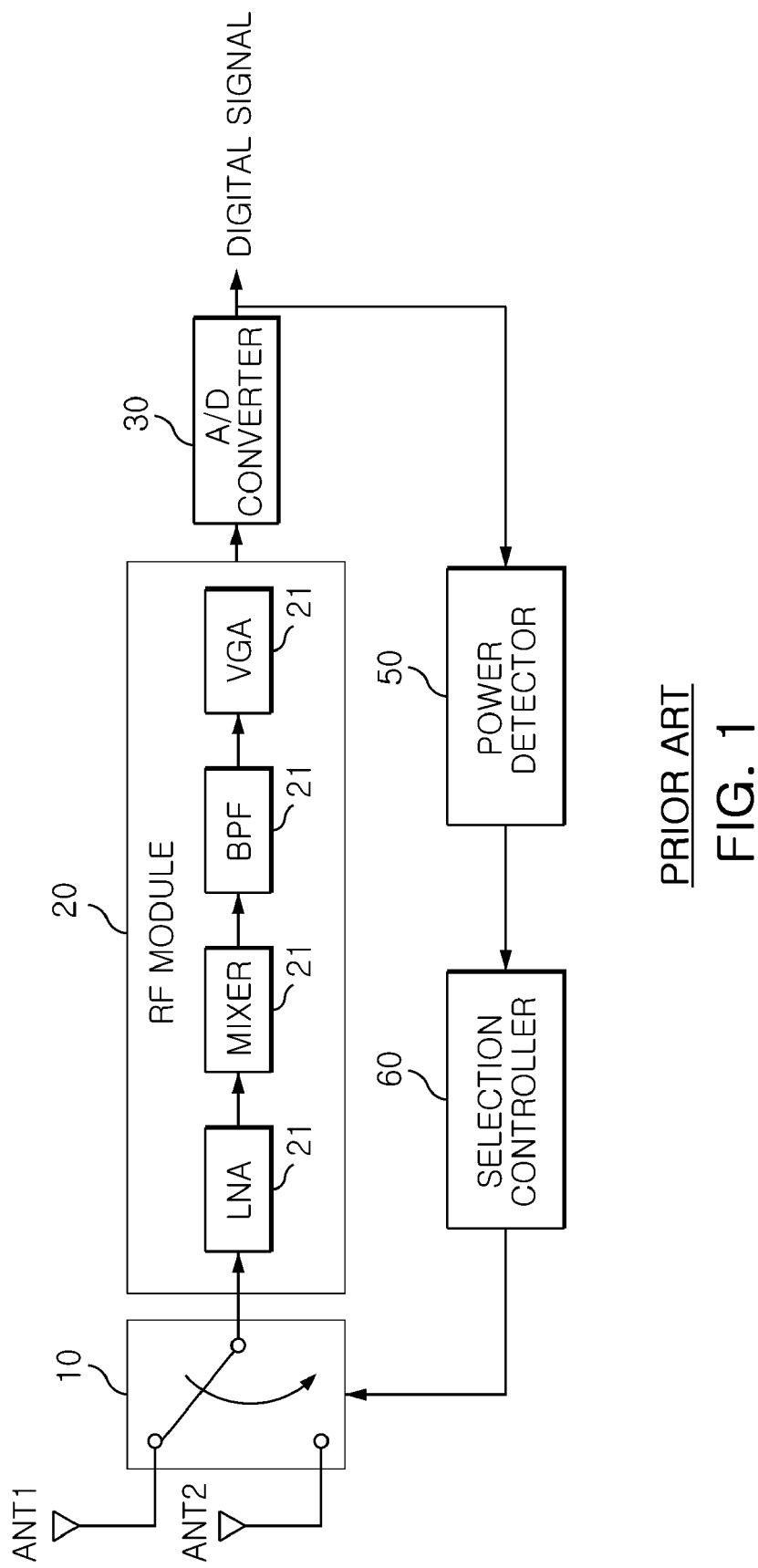
FIG. 1 is a block diagram of a related art antenna diversity receiver.

Exemplary embodiments of the present invention will now be described in detail with reference to the accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 2:
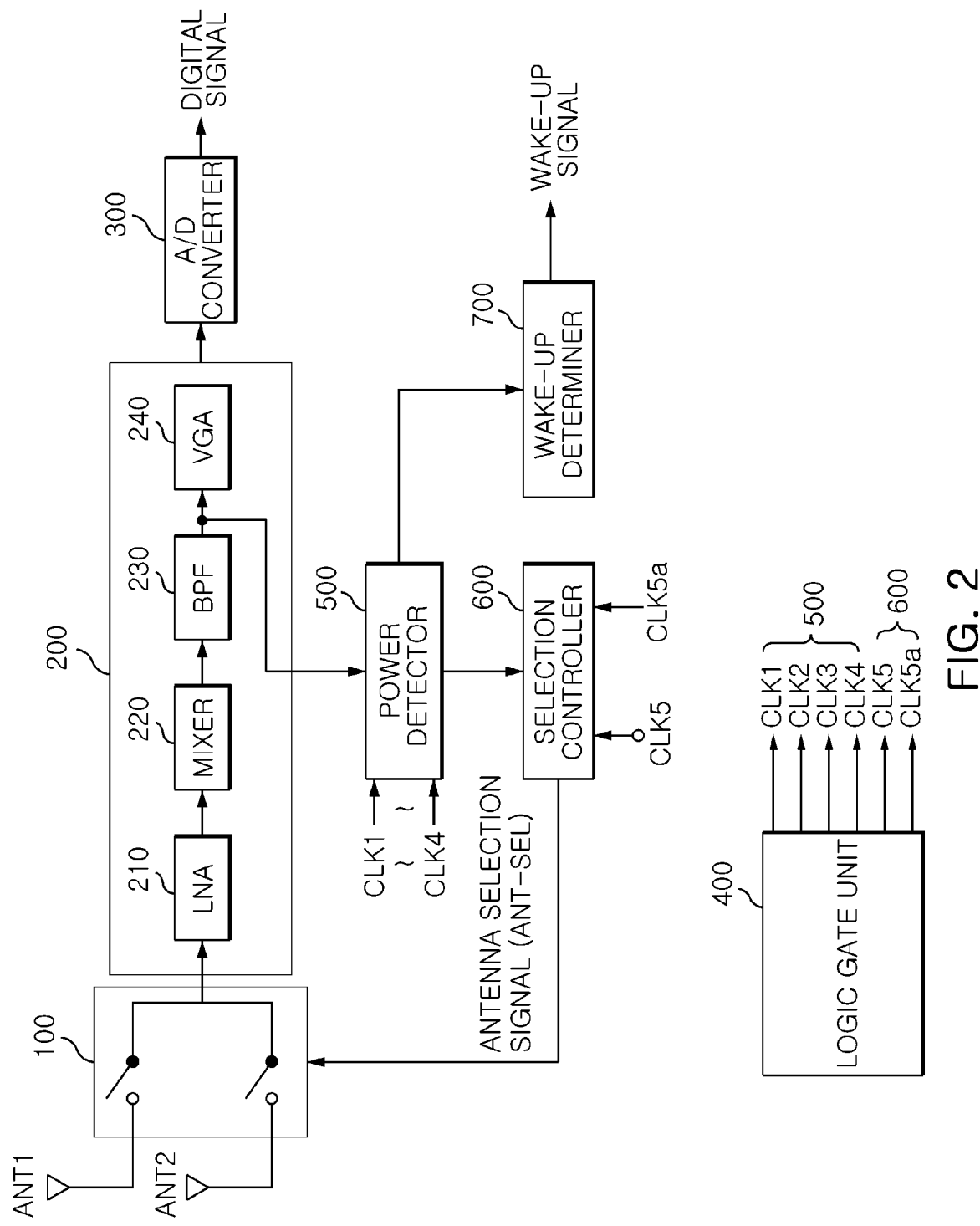
FIG. 2 is a block diagram of an antenna diversity receiver according to an embodiment of the present invention.

FIG. 2 is a block diagram of an antenna diversity receiver according to an embodiment of the present invention.

Referring to FIG. 2, an antenna diversity receiver according to an embodiment of the present invention includes a plurality of antennas, an antenna selector unit 100, a radio frequency (RF) module unit 200, a logic gate unit 400, a power detector unit 500, and a selection controller unit 600. The antenna selector unit 100 selects one of the antennas. The RF module unit 200 converts an RF receive (RX) signal received from the antenna selector unit 100 into a baseband RX signal. The logic gate unit 400 controls a power detection mode for detecting the power levels of RX signals received through the antennas and an operation mode for selecting one of the antennas on the basis of the detected power. Under the control of the logic gate unit 400, the power detector unit 500 detects the power level of the RX signal received through each of the antennas, on the basis of the RX signal received through the RF module unit 200. Under the control of the logic gate unit 400, the selection controller unit 600 controls the antenna selector unit 100 to sequentially select the antennas in the power detection mode and controls the antenna selector unit 100 to select the antenna with a relatively good RX sensitivity among the antennas in the operation mode on the basis of the power levels detected by the power detector unit 500.

The RF module unit 200 includes a low-noise amplifier (LNA) 210, a mixer 220, a band-pass filter (BPF) 230, and a variable-gain amplifier (VGA) 240. The low-noise amplifier 210 low-noise-amplifies the RF RX signal received from the antenna selector unit 100. The mixer 220 converts the RF RX signal received from the low-noise amplifier 210 into a baseband RX signal. The band-pass filter 230 passes an RX signal of a predetermined band among the RX signals received from the mixer 220. The variable-gain amplifier 240 amplifies the signal received from the band-pass filter 230.

On the basis of the RX signal output from the band-pass filter 230 of the RF module unit 200, the power detector unit 500 detects the power level of the RX signal received through each of the antennas.

Specific embodiments of the present invention will now be described with reference to FIGS. 2 through 4.

Referring to FIG. 2, the antennas of the present invention may include a first antenna ANT1 and a second antenna ANT2.

In this case, the antenna selector unit 100 may include a first antenna switch M11 and a second antenna switch M12. The first antenna switch M11 is configured to select the first antenna ANT1 under the control of the selection controller unit 600. The second antenna switch M12 is configured to select the second antenna ANT2 under the control of the selection controller unit 600.

In the power detection mode, the logic gate unit 400 may generate first and second clock signals CLK1 and CLK2, which are used to detect the power level of the RX signal received through the first antenna ANT1, and third and fourth clock signals CLK3 and CLK4, which are used to detect the power level of the RX signal received through the second antenna ANT2, to output the first and second clock signals CLK1 and CLK2 and the third and fourth clock signals CLK3 and CLK4 to the power detector unit 500. In the power detection mode, the logic gate unit 400 may generate a fifth clock signal CLK5, which is used to select the first antenna ANT1 or the second antenna ANT2, to output the fifth clock signal CLK5 to the selection controller unit 600. The logic gate unit 400 may generate a mode selection signal CLK5a, which is used to select the fifth clock signal CLK5 in the power detection mode and to select the output signal of the power detector unit 500 in the operation mode, to output the mode selection signal CLK5a to the selection controller unit 600.

Figure 3:
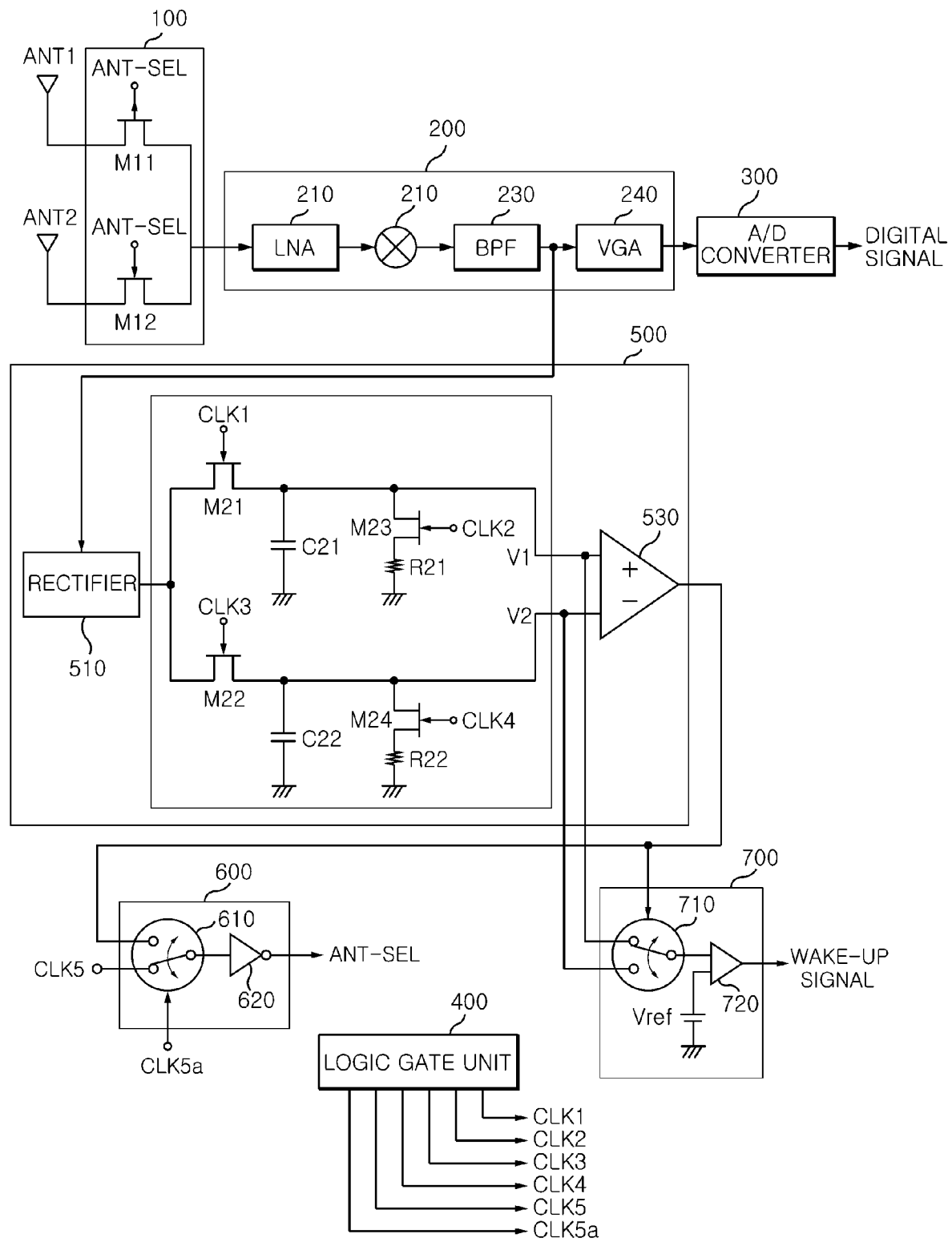
FIG. 3 is a detailed block diagram of the antenna diversity receiver according to an embodiment of the present invention.

FIG. 3 is a detailed block diagram of the antenna diversity receiver according to an embodiment of the present invention.

Referring to FIG. 3, the power detector unit 500 includes a rectifier unit 510, a first capacitor C21, a second capacitor C22, and a comparator 530. The rectifier unit 510 rectifies a signal received from the band-pass filter 230. The first capacitor C21 is connected between a ground terminal and an output terminal of the rectifier unit 510 to be charged with a voltage corresponding to a signal received through the first antenna ANT1. The second capacitor C22 is connected between the ground terminal and the output terminal of the rectifier unit 510 in parallel to the first capacitor C21 to be charged with a voltage corresponding to a signal received through the second antenna ANT2. The comparator 530 compares a first detection voltage V1 charged in the first capacitor C21 with a second detection voltage V2 charged in the second capacitor C22, to output a comparison result signal with regard to the first detection voltage V1 and the second detection voltage V2.

The power detector unit 500 further includes a first charge switch M21, a second charge switch M22, a first discharge switch M23, and a second discharge switch M24. The first charge switch M21 is connected between the first capacitor C21 and the output terminal of the rectifier unit 510 to switch a charge path of the first capacitor C21 in response to the first clock signal CLK1 of the logic gate unit 400. The second charge switch M22 is connected between the second capacitor C22 and an output terminal of the band-pass filter 230 to switch a charge path of the second capacitor C22 in response to the third clock signal CLK3 of the logic gate unit 400. The first discharge switch M23 is connected in parallel to the both ends of the first capacitor C21 to switch a discharge path of the first capacitor C21 in response to the second clock signal CLK2 of the logic gate unit 400. The second discharge switch M24 is connected in parallel to the both ends of the second capacitor C22 to switch a discharge path of the second capacitor C22 in response to the fourth clock signal CLK4 of the logic gate unit 400.

In the power detection mode, the selection controller unit 600 selects and provides the fifth clock signal CLK5 received from the logic gate unit 400 to the antenna selector unit 100 in response to the mode selection signal CLK5a of the logic gate unit 400. In the operation mode, the selection controller unit 600 provides a power level signal detected by the power detector unit 500 to the antenna selector unit 100 in response to the mode selection signal CLK5a.

In the power detection mode, when the fifth clock signal CLK5 is used to select the first antenna ANT1, the logic gate unit 400 uses the first and second clock signals CLK1 and CLK2 to control the first charge switch M21/the first discharge switch M23 to be off/on for discharge of the first capacitor C21, and then uses the first and second clock signals CLK1 and CLK2 to control the first antenna switch M11/the first charge switch M21/the first discharge switch M23 to be on/on/off for detection of the first detection voltage V1 through charge of the first capacitor C21.

In the power detection mode, when the fifth clock signal CLK5 is used to select the second antenna ANT2, the logic gate unit 400 uses the third and fourth clock signals CLK3 and CLK4 to control the second charge switch M22/the second discharge switch M24 to be off/on for discharge of the second capacitor C22, and then uses the third and fourth clock signals CLK3 and CLK4 to control the second antenna switch M12/the second charge switch M22/the second discharge switch M24 to be on/on/off for detection of the second detection voltage V2 through charge of the second capacitor C22.

If the first detection voltage V1 is higher than the second detection voltage V2, the power detector unit 500 outputs a signal for selection of the first antenna ANT1; and if the first detection voltage V1 is not higher than the second detection voltage V2, the power detector unit 500 outputs a signal for selection of the second antenna ANT2.

In the operation mode, the logic gate unit 400 selects and provides an output signal of the power detector unit 500 to the first and second antenna switches M11 and M12 of the antenna selector unit 100, so that on the basis of the output signal of the power detector unit 500, the logic gate unit 400 controls the first antenna switch M11 to select the first antenna ANT1 if the first detection voltage V1 is higher than the second detection voltage V2, and controls the second antenna switch M12 to select the second antenna ANT2 if the first detection voltage V1 is not higher than the second detection voltage V2.

For example, as illustrated in FIG. 3, the first and second antenna switches M1 and M12 of the antenna selector unit 100 may be implemented respectively by a PMOS transistor and an NMOS transistor, and the first and second charge switches M21 and M22 and the first and second discharge switches M23 and M24 of the power detector unit 500 may be implemented by NMOS transistors.

Meanwhile, the antenna diversity receiver of the present invention may further include a wake-up determiner unit 700. The wake-up determiner unit 700 determines whether the power level detected by the power detector unit 500 is higher than a predetermined wake-up power level. If the detected power level is higher than the predetermined wake-up power level, the wake-up determiner unit 700 outputs a wake-up signal.

Figure 4:
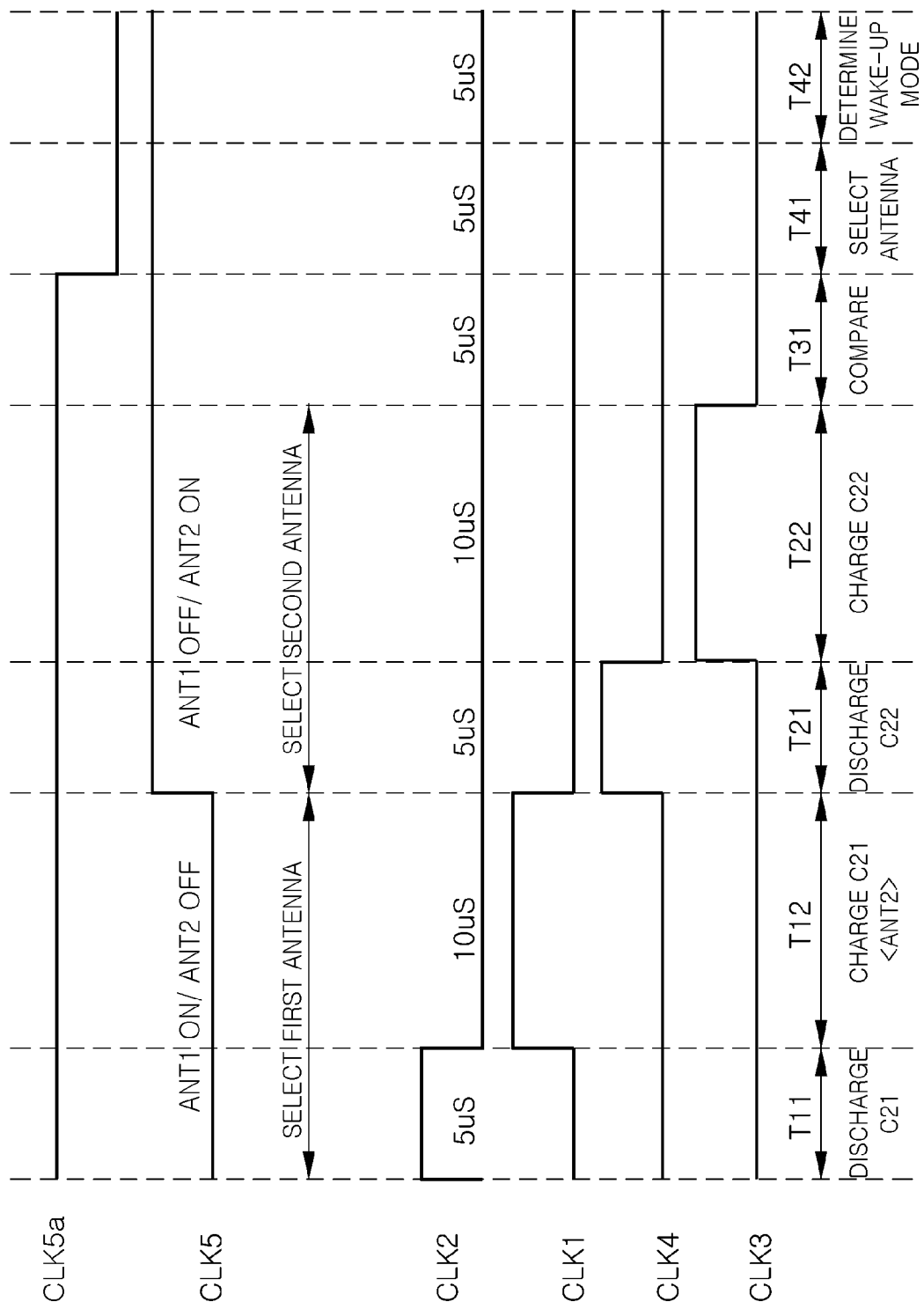
FIG. 4 is a timing diagram of first to fifth clock signals and a mode selection signal according to an embodiment of the present invention.

FIG. 4 is a timing diagram of the first to fifth clock signals and the mode selection signal according to an embodiment of the present invention.

Referring to FIG. 4, the reference symbols CLK1, CLK2, CLK3, CLK4, CLK5 and CLK5a respectively denote the first clock signal, the second clock signal, the third clock signal, the fourth clock signal, the fifth clock signal, and the mode selection signal.

The first clock signal CLK1, the second clock signal CLK2, the third clock signal CLK3, the fourth clock signal CLK4, the fifth clock signal CLK5, and the mode selection signal CLK5a may be generated by the selection controller unit 600.

A first period T11, which is determined according to the states of the first to fifth clock signals CLK1 to CLK5 and the mode selection signal CLK5a, is a discharge period of the first capacitor C21, a second period T12 is a charge period of the first capacitor C21, and the first antenna ANT1 is selected in the second period T12.

A third period T21 is a discharge period of the second capacitor C22, a fourth period T22 is a charge period of the second capacitor C22, and the second antenna ANT2 is selected in the fourth period T22.

The fourth period T22 is a comparison period, a fifth period T41 is an antenna selection period, and a sixth period T42 is a wake-up determination period.

Figure 5:
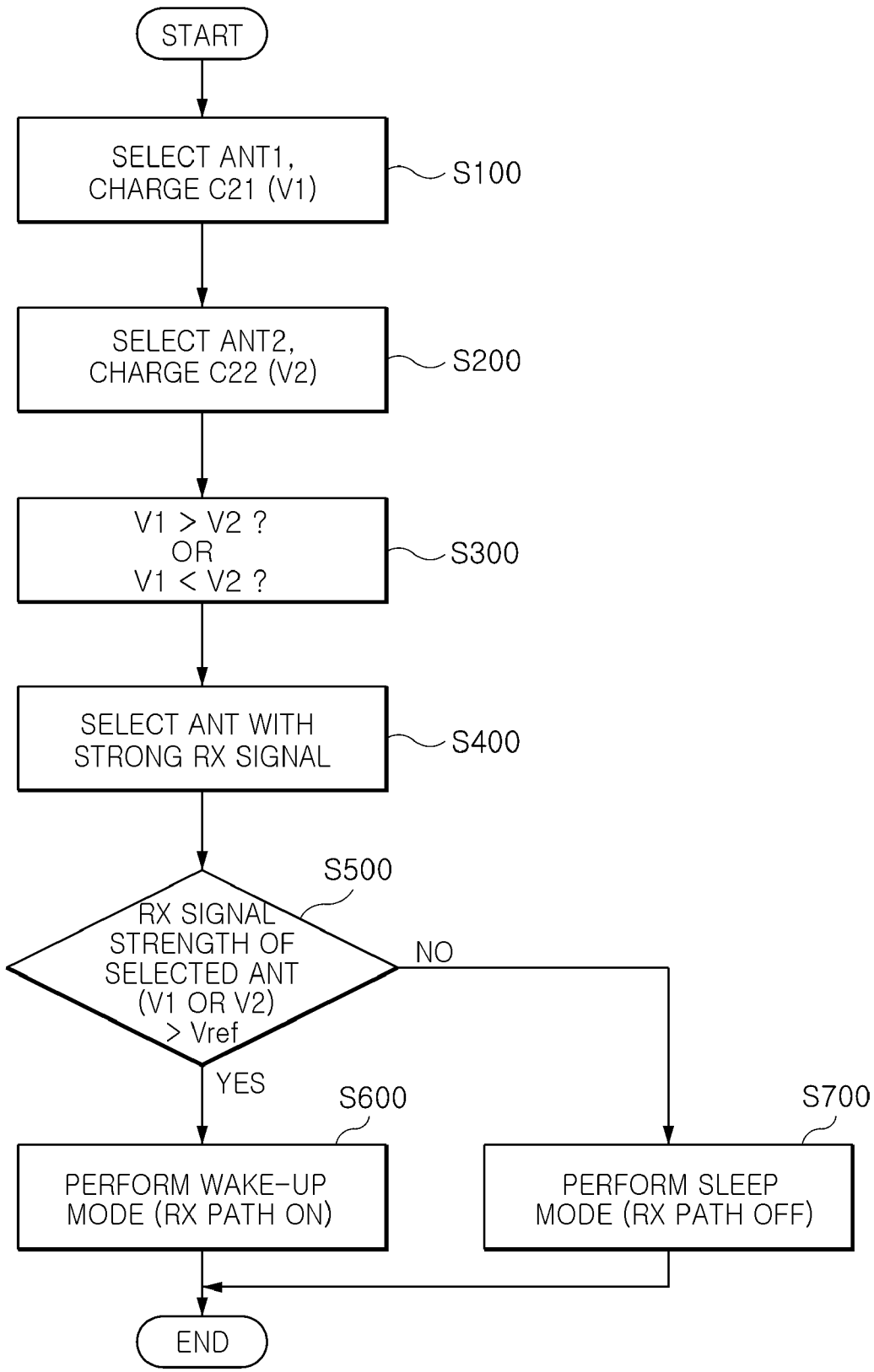
FIG. 5 is a flowchart illustrating a diversity antenna selection process according to an embodiment of the present invention.

FIG. 5 is a flowchart illustrating a diversity antenna selection process according to an embodiment of the present invention.

Referring to FIG. 5, step S100 is to detect the level of the first detection voltage V1, that is, the power of a signal received through the first antenna ANT1. Step S200 is to detect the level of the second detection voltage V2, that is, the power of a signal received through the second antenna ANT2. Step S300 is to compare the detected level of the first detection voltage V1 with the detected level of the second detection voltage V2. Step S400 is to select the first antenna ANT1 if the first detection voltage V1 is higher than the second detection voltage V2, and to select the second antenna ANT2 if the first detection voltage V1 is not higher than the second detection voltage V2. Step S500 is to determine whether the RX signal of the selected antenna is stronger than a predetermined signal Vref. Step S600 is to generate a wake-up signal to perform a wake-up mode if the RX signal of the selected antenna is stronger than the predetermined signal Vref. Step S700 is to perform a sleep mode if the RX signal of the selected antenna is not stronger than the predetermined signal Vref.

Hereafter, the operation and effect of the present invention will be described in detail with reference to the accompanying drawings.

The antenna diversity receiver according to the present invention will be described in detail with reference to FIGS. 2 through 5, using an exemplary case where the antennas of the present invention include the first antenna ANT1 and the second antenna ANT2.

Referring to FIG. 2, the antenna diversity receiver of the present invention performs the power detection mode to detect the power of an RX signal received from each of the first and second antenna ANT1 and ANT2, and then performs the operation mode to select the antenna with a relatively good RX sensitivity on the basis of the detected power.

To this end, the logic gate unit 400 may operate in the power detection mode for detecting the power levels of RX signals received through the first and second antennas ANT1 and ANT2, and may operate in the operation for selecting one of the first and second antennas ANT1 and ANT2 on the basis of the power levels detected in the power detection mode.

In the power detection mode, under the control of the logic gate unit 400, the selection controller unit 600 controls the antenna selector unit 100 to sequentially select the first and second antennas ANT1 and ANT2.

Herein, the antenna selector unit 100 sequentially selects the first antenna ANT1 and the second antenna ANT2 under the control of the selection controller unit 600.

That is, the antenna selector unit 100 selects the first antenna ANT1 by means of the first antenna switch M11 operated under the control of the selection controller unit 600, and then selects the second antenna ANT2 by means of the second antenna switch M12 operated under the control of the selection controller unit 600.

An RX signal from the antenna selected by the antenna selector unit 100 is converted by the RF module unit 200 into a baseband RX signal.

Herein, the RF module unit 200 may include the low-noise amplifier 210, the mixer 220, the band-pass filter 230, and the variable-gain amplifier 240. In this case, the low-noise amplifier 210 low-noise-amplifies an RF RX signal received from the antenna selector unit 100, and outputs the resulting signal to the mixer 220. The mixer 220 converts the RF RX signal received from the low-noise amplifier 210 into a baseband RX signal, and outputs the baseband RX signal to the band-pass filter 230. The band-pass filter 230 selects an RX signal of a predetermined band among the RX signals received from the mixer 220, and outputs the selected RX signal to the variable-gain amplifier 240. The variable-gain amplifier 240 amplifies the signal received from the band-pass filer 230.

Using the RX signals received from the RF module unit 200, the power detector unit 500 detects the power of a signal received through each of the first and second antennas ANT1 and ANT2. For example, the power detector unit 500 rectifies an RX signal output from the band-pass filer 230 of the RF module unit 200, and uses the rectified RX signal to detect the power of the signal received through each of the first and second antennas ANT1 and ANT2.

In the operation mode, the selection controller unit 600 controls the antenna selector unit 100 to select the antenna with a relatively good RX sensitivity among the first and second antennas ANT1 and ANT2 on the basis of the power levels detected by the power detector unit 500.

Herein, the antenna selector unit 100 selects the antenna with a relatively good RX sensitivity under the control of the selection controller unit 600.

Hereinafter, the logic gate unit 400, the selection controller unit 600, and the power detector unit 500 will be described in detail with reference to FIGS. 2 through 4.

In the power detection mode, the logic gate unit 400 generates first and second clock signals CLK1 and CLK2, which are used to detect the power level of the RX signal received through the first antenna ANT1, and third and fourth clock signals CLK3 and CLK4, which are used to detect the power level of the RX signal received through the second antenna ANT2, to output the first and second clock signals CLK1 and CLK2 and the third and fourth clock signals CLK3 and CLK4 to the power detector unit 500. In the power detection mode, the logic gate unit 400 generates a fifth clock signal CLK5, which is used to select the first antenna ANT1 or the second antenna ANT2, to output the fifth clock signal CLK5 to the selection controller unit 600. The logic gate unit 400 generates a mode selection signal CLK5a, which is used to select the fifth clock signal CLK5 in the power detection mode and to select the output signal of the power detector unit 500 in the operation mode, to output the mode selection signal CLK5a to the selection controller unit 600.

In the power detection mode, the logic gate unit 400 uses the fifth clock signal CLK5 to control the selection controller unit 600 to sequentially select the first antenna ANT1 and the second antenna ANT2.

Herein, the selection controller unit 600 selects and provides the fifth clock signal CLK5 to the antenna selector unit 100 in response to the mode selection signal CLK5$a$, and the antenna selector unit 100 sequentially selects the first antenna ANT1 and the second antenna ANT2 in response to the fifth clock signal CLK5.

While the first antenna ANT1 is selected by the selection controller unit 600, the power detector unit 500 operates as follows.

The first charge switch M21/the first discharge switch M23 of the power detector unit 500 is turned off/on in response to the first/second clock signal CLK1/CLK2 to discharge the first capacitor C21.

Then, the first antenna switch M11/the first charge switch M21/the first discharge switch M23 is turned on/on/off according to the first and second clock signals CLK1 and CLK2 to charge the first capacitor C21 to detect the first detection voltage V1.

While the second antenna ANT2 is selected by the selection controller unit 600, the power detector unit 500 operates as follows.

The second charge switch M22/the second discharge switch M24 of the power detector unit 500 is turned off/on in response to the third/fourth clock signal CLK3/CLK4 to discharge the second capacitor C22.

Then, the second antenna switch M12/the second charge switch M22/the second discharge switch M24 is turned on/on/off according to the third and fourth clock signals CLK3 and CLK4 to charge the second capacitor C22 to detect the second detection voltage V2.

The comparator 530 of the power detector unit 500 compares the first detection voltage V1 charged in the first capacitor C21 with the second detection voltage V2 charged in the second capacitor C22, to output a comparison result signal with regard to the first detection voltage V1 and the second detection voltage V2.

Herein, if the first detection voltage V1 is higher than the second detection voltage V2, the comparator 530 of the power detector unit 500 outputs a signal for selection of the first antenna ANT1; and if the first detection voltage V1 is not higher than the second detection voltage V2, the comparator 530 of the power detector unit 500 outputs a signal for selection of the second antenna ANT2.

In the operation mode, using the fifth clock signal CLK5, the selection controller unit 600 selects an output signal of the power detector unit 500 to output the selected signal to the antenna selector unit 100. Herein, the antenna selector unit 100 selects the antenna with a relatively high power level in response to the output signal of the power detector unit 500.

That is, in the operation mode, the selection controller unit 600 selects and provides an output signal of the power detector unit 500 to the first and second antenna switches M11 and M12 of the antenna selector unit 100, so that on the basis of the output signal of the power detector unit 500, the selection controller unit 600 controls the first antenna switch M11 to select the first antenna ANT1 if the first detection voltage V1 is higher than the second detection voltage V2, and controls the second antenna switch M12 to select the second antenna ANT2 if the first detection voltage V1 is not higher than the second detection voltage V2.

Meanwhile, if the antenna diversity receiver of the present invention includes the wake-up determiner unit 700, the wake-up determiner unit 700 determines whether the power level detected by the power detector unit 500 is higher than a predetermined wake-up power level and outputs a wake-up signal if the detected power level is higher than the predetermined wake-up power level.

Herein, the wake-up determiner unit 700 provides the wake-up signal to the variable-gain amplifier 240 of the RF module unit 200, the A/D converter 300, a modem, and an MCU so that the wake-up mode is not enabled if the level of an RX signal received through the selected antenna is lower than the predetermined wake-up power level.

Therefore, the operation state can be determined according to the wake-up signal and the operation is not performed in the case of no signal reception, thus reducing the power consumption.

Hereinafter, with reference to FIG. 4, the operation of the present invention will be described in terms of the signals provided by the logic gate unit 400.

Using the states of the mode selection signal CLK5$a$ and the first to fifth clock signals CLK1 to CLK5, the logic gate unit 400 controls the operation periods as illustrated in FIG. 4.

Herein, the power detection mode may be set if the mode selection signal CLK5$a$ is at a high level; and the operation mode may be set if the mode selection signal CLK5$a$ is at a low level.

In the case of the power detection mode, i.e., when the mode selection signal CLK5$a$ is at a high level, the selection controller unit 600 selects and outputs the fifth clock signal CLK5 to the antenna selector unit 100.

Herein, the antenna selector unit 100 sequentially selects the first antenna ANT1 and the second antenna ANT2 in response to the fifth clock signal CLK5. That is, the first antenna ANT1 is selected by the first antenna switch M11 of the antenna selector unit 100 while the fifth clock signal CLK5 is at a low level; and the second antenna ANT2 is selected by the second antenna switch M12 of the antenna selector unit 100 while the fifth clock signal CLK5 is at a high level.

When the first antenna ANT1 is selected, the first capacitor C21 of the power detector unit 500 is sequentially discharged and charged to detect the power (V1) of an RX signal received through the first antenna ANT1.

When the second antenna ANT2 is selected, the second capacitor C22 of the power detector unit 500 is sequentially discharged and charged to detect the power (V2) of an RX signal received through the second antenna ANT2.

The comparator 530 of the power detector unit 500 compares the first detection voltage V1 of the first capacitor C21 with the second detection voltage V2 of the second capacitor C22. If the first detection voltage V1 is higher than the second detection voltage V2, the comparator 530 outputs a negative voltage. On the other hand, if the first detection voltage V1 is not higher than the second detection voltage V2, the comparator 530 outputs a positive voltage.

In the case of the operation mode, i.e., when the mode selection signal CLK5$a$ is at a low level, the selection controller unit 600 outputs an output signal of the power detector unit 500 to the antenna selector unit 100.

Therefore, if the first and second antenna switches M11 and M12 of the antenna selector unit 100 are implemented respectively by a PMOS transistor and an NMOS transistor, when the output signal of the power detector unit 500 is a negative voltage, the first antenna switch M11 is turned on to select the first antenna ANT1. On the other hand, when the output signal of the power detector unit 500 is a positive voltage, the second antenna switch M12 is turned on to select the second antenna ANT2.

Accordingly, the antenna can be directly selected by the output signal of the power detector unit 500.

Hereinafter, the operation periods of the present invention will be described with reference to FIG. 4.

As illustrated in FIG. 4, in relation to the first period T11 corresponding to the discharge period of the first capacitor C21, the second period T12 corresponding to the charge period of the first capacitor C21, the third period T21 corresponding to the discharge period of the second capacitor C22, the fourth period T22 corresponding to the charge period of the second capacitor C22, the fifth period T31 for comparing the first and second detection voltages V1 and V2, the sixth period T41 for selecting the antenna with relatively high power, and the seventh period T42 for determining the wake-up mode on the basis of the power of an RX signal received through the selected antenna, the first to fifth clock signals CLK1 to CLK5 and the mode selection signal CLK5a are controlled as shown in Table 1.

TABLE 1

|  | CLK1 | CLK2 | CLK3 | CLK4 | CLK5 | CLK5a |  | Operation of Power Detector |
|---|---|---|---|---|---|---|---|---|
| T11 | 0 | 1 | X | X | 0 | 1 | Sel.ANT1 | Discharge C21, ANT1: On M23: On |
| T12 | 0 | 0 | X | X | 0 | 1 |  | charge C21, ANT1: On M21: On |
| T21 | X | X | 0 | 1 | 1 | 1 | Sel.ANT2 | Discharge C22, ANT2: On M24: On |
| T22 | X | X | 1 | 0 | 1 | 1 |  | charge C22, ANT2: On M22: On |
| T31 | 0 | 0 | 0 | 0 | 1 | 1 | Compare |  |
| T41 | 0 | 0 | 0 | 0 | 0 | 0 | Sel. ANT |  |
| T51 | 0 | 0 | 0 | 0 | 0 | 0 | Wake-up |  |

Referring to FIG. 5, step S100 of detecting the level of the first detection voltage V1, that is, the power of a signal received through the first antenna ANT1 is performed, and then step S200 of detecting the level of the second detection voltage V2, that is, the power of a signal received through the second antenna ANT2 is performed.

Thereafter, step S300 of comparing the detected level of the first detection voltage V1 with the detected level of the second detection voltage V2 is performed. Thereafter, step S400 of selecting the first antenna ANT1 if the first detection voltage V1 is higher than the second detection voltage V2 and selecting the second antenna ANT2 if the first detection voltage V1 is not higher than the second detection voltage V2 is performed.

Thereafter, step S500 of determining whether the RX signal of the selected antenna is stronger than a predetermined signal Vref is performed. Thereafter, step S600 of generating a wake-up signal to perform a wake-up mode if the RX signal of the selected antenna is stronger than the predetermined signal Vref is performed, and step S700 of performing a sleep mode if the RX signal of the selected antenna is not stronger than the predetermined signal Vref is performed.

As described above, the RX signal received from the circuit unit followed by the A/D converter, i.e., the band-pass filter of the RF module unit is used as a monitoring signal for power detection. Therefore, the circuit unit following the band-pass filter does not operate in the power detection mode, thereby making it possible to reduce the power consumption.

Also, when the wake-up state is determined according to the RX signal received from the band-pass filter, the operation state can be determined according to the determined wake-up state. Therefore, the power detection mode and the operation mode are not performed in the case of the non-wake-up state, thereby making it possible to further reduce the power consumption.

As described above, the present invention can reduce power consumption by detecting the power of an RX signal at the front end of the A/D converter, i.e., the RF module unit, and can further reduce the power consumption by determining a wake-up mode at the RF module unit according to the power of an RX signal.

Also, the present invention can reduce the power consumption in the circuits such as the variable-gain amplifier and the A/D converter by measuring the strength of an RX signal at the node following the band-pass filter, and can minimize the power consumption by determining the operation states of the modem and the controller (MCU) using a wake-up function.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna diversity receiver, comprising:
   a plurality of antennas;
   an antenna selector unit for selecting one of the antennas;
   a radio-frequency (RF) module unit for converting an RF receive (RX) signal received from the antenna selector unit into a baseband RX signal;
   a logic gate unit for controlling a power detection mode for detecting a power level of an RX signal received through each of the antennas and an operation mode for selecting one of the antennas based on the detected power level;
   a power detector unit for detecting the power level of the RX signal received through each of the antennas based on the RX signal received through the RF module unit, under a control of the logic gate unit; and
   a selection controller unit for controlling the antenna selector unit to sequentially select the antennas in the power detection mode and controlling the antenna selector unit to select an antenna with a highest RX sensitivity among the antennas in the operation mode based on the power level detected by the power detector unit, under the control of the logic gate unit, wherein
   the RF module unit comprises:
      a low-noise amplifier for low-noise-amplifying the RF RX signal received from the antenna selector unit;
      a mixer for converting the RF RX signal received from the low-noise amplifier into a baseband RX signal;
      a band-pass filter for passing an RX signal of a predetermined band among the RX signals received from the mixer; and
      a variable-gain amplifier for amplifying the RX signal received from the band-pass filter,
   the power detector unit is configured to detect the power level of the RX signal received through each of the antennas based on the RX signal output from the band-pass filter of the RF module unit,
   the antennas comprise a first antenna and a second antenna,
   the antenna selector unit comprises:
      a first antenna switch configured to select the first antenna under a control of the selection controller unit; and
      a second antenna switch configured to select the second antenna under the control of the selection controller unit, the logic gate unit is configured to:
- generate, in the power detection mode, first and second clock signals used to detect the power level of the RX signal received through the first antenna and third and fourth clock signals used to detect the power level of the RX signal received through the second antenna, to output the first and second clock signals and the third and fourth clock signals to the power detector unit;
- generate, in the power detection mode, a fifth clock signal used to select the first antenna or the second antenna, to output the fifth clock signal to the selection controller unit; and
- generate a mode selection signal used to select the fifth clock signal in the power detection mode and to select the output signal of the power detector unit in the operation mode, to output the mode selection signal to the selection controller unit, and the power detector unit comprises:
- a rectifier unit for rectifying the RX signal received from the band-pass filter;
- a first capacitor connected between a ground terminal and an output terminal of the rectifier unit to be charged with a voltage corresponding to the RX signal received through the first antenna;
- a second capacitor connected between the ground terminal and the output terminal of the rectifier unit in parallel to the first capacitor to be charged with a voltage corresponding to the RX signal received through the second antenna;
- a comparator for comparing a first detection voltage charged in the first capacitor with a second detection voltage charged in the second capacitor, to output a comparison result signal with regard to the first detection voltage and the second detection voltage;
- a first charge switch connected between the first capacitor and the output terminal of the rectifier unit to switch a charge path of the first capacitor in response to the first clock signal of the logic gate unit;
- a second charge switch connected between the second capacitor and an output terminal of the band-pass filter to switch a charge path of the second capacitor in response to the third clock signal of the logic gate unit;
- a first discharge switch connected in parallel to the first capacitor to switch a discharge path of the first capacitor in response to the second clock signal of the logic gate unit; and
- a second discharge switch connected in parallel to the second capacitor to switch a discharge path of the second capacitor in response to the fourth clock signal of the logic gate unit.

2. The antenna diversity receiver of claim 1, wherein the selection controller unit is configured to:
- select and provide the fifth clock signal received from the logic gate unit to the antenna selector unit in response to the mode selection signal of the logic gate unit in the power detection mode; and
- provide a power level signal detected by the power detector unit to the antenna selector unit in response to the mode selection signal in the operation mode.

3. The antenna diversity receiver of claim 2, wherein in the power detection mode, when the fifth clock signal is used to select the first antenna, the logic gate unit is configured to use the first and second clock signals to control the first charge switch/the first discharge switch to be off/on for discharge of the first capacitor, and then use the first and second clock signals to control the first antenna switch/the first charge switch/the first discharge switch to be on/on/off for detection of the first detection voltage through charge of the first capacitor.

4. The antenna diversity receiver of claim 2, wherein in the power detection mode, when the fifth clock signal is used to select the second antenna, the logic gate unit is configured to use the third and fourth clock signals to control the second charge switch/the second discharge switch to be off/on for discharge of the second capacitor, and then use the third and fourth clock signals to control the second antenna switch/the second charge switch/the second discharge switch to be on/on/off for detection of the second detection voltage through charge of the second capacitor.

5. The antenna diversity receiver of claim 2, wherein when the first detection voltage is higher than the second detection voltage, the power detector unit is configured to output a signal for selection of the first antenna; and when the first detection voltage is equal to or lower than the second detection voltage, the power detector unit is configured to output a signal for selection of the second antenna.

6. The antenna diversity receiver of claim 5, wherein in the operation mode, the logic gate unit is configured to select and provide an output signal of the power detector unit to the first and second antenna switches of the antenna selector unit, so that on the basis of the output signal of the power detector unit, the logic gate unit controls the first antenna switch to select the first antenna when the first detection voltage is higher than the second detection voltage, and controls the second antenna switch to select the second antenna when the first detection voltage is equal to or lower than the second detection voltage.

7. An antenna diversity receiver, comprising:
- a plurality of antennas;
- an antenna selector unit for selecting one of the antennas;
- a radio-frequency (RF) module unit for converting an RF receive (RX) signal received from the antenna selector unit into a baseband RX signal;
- a logic gate unit for controlling a power detection mode for detecting a power level of an RX signal received through each of the antennas and an operation mode for selecting one of the antennas based on the detected power level;
- a power detector unit for detecting the power level of the RX signal received through each of the antennas based on the RX signal received through the RF module unit, under a control of the logic gate unit;
- a selection controller unit for controlling the antenna selector unit to sequentially select the antennas in the power detection mode and controlling the antenna selector unit to select an antenna with a highest RX sensitivity among the antennas in the operation mode based on the power level detected by the power detector unit, under the control of the logic gate unit; and
- a wake-up determiner unit for determining whether or not the power level detected by the power detector unit is higher than a predetermined wake-up power level, and outputting a wake-up signal when the detected power level is higher than the predetermined wake-up power level, wherein the RF module unit comprises:
- a low-noise amplifier for low-noise-amplifying the RF RX signal received from the antenna selector unit;
- a mixer for converting the RF RX signal received from the low-noise amplifier into a baseband RX signal;
- a band-pass filter for passing an RX signal of a predetermined band among the RX signals received from the mixer; and a variable-gain amplifier for amplifying the RX signal received from the band-pass filter, the power detector unit is configured to detect the power level of the RX signal received through each of the antennas based on the RX signal output from the band-pass filter of the RF module unit, the antennas comprise a first antenna and a second antenna, the antenna selector unit comprises:
- a first antenna switch configured to select the first antenna under a control of the selection controller unit; and
- a second antenna switch configured to select the second antenna under the control of the selection controller unit, the logic gate unit is configured to:
- generate, in the power detection mode, first and second clock signals used to detect the power level of the RX signal received through the first antenna and third and fourth clock signals used to detect the power level of the RX signal received through the second antenna, to output the first and second clock signals and the third and fourth clock signals to the power detector unit;
- generate, in the power detection mode, a fifth clock signal used to select the first antenna or the second antenna, to output the fifth clock signal to the selection controller unit; and
- generate a mode selection signal used to select the fifth clock signal in the power detection mode and to select the output signal of the power detector unit in the operation mode, to output the mode selection signal to the selection controller unit, the power detector unit comprises:
- a rectifier unit for rectifying the RX signal received from the band-pass filter;
- a first capacitor connected between a ground terminal and an output terminal of the rectifier unit to be charged with a voltage corresponding to the RX signal received through the first antenna;
- a second capacitor connected between the ground terminal and the output terminal of the rectifier unit in parallel to the first capacitor to be charged with a voltage corresponding to a signal received through the second antenna; and
- a comparator for comparing a first detection voltage charged in the first capacitor with a second detection voltage charged in the second capacitor, to output a comparison result signal with regard to the first detection voltage and the second detection voltage;
- a first charge switch connected between the first capacitor and the output terminal of the rectifier unit to switch a charge path of the first capacitor in response to the first clock signal of the logic gate unit;
- a second charge switch connected between the second capacitor and an output terminal of the band-pass filter to switch a charge path of the second capacitor in response to the third clock signal of the logic gate unit;
- a first discharge switch connected in parallel to the both ends of the first capacitor to switch a discharge path of the first capacitor in response to the second clock signal of the logic gate unit; and
- a second discharge switch connected in parallel to the both ends of the second capacitor to switch a discharge path of the second capacitor in response to the fourth clock signal of the logic gate unit.

8. The antenna diversity receiver of claim 7, wherein the selection controller unit is configured to:
- select and provide the fifth clock signal received from the logic gate unit to the antenna selector unit in response to the mode selection signal of the logic gate unit in the power detection mode; and
- provide a power level signal detected by the power detector unit to the antenna selector unit in response to the mode selection signal in the operation mode.

9. The antenna diversity receiver of claim 8, wherein in the power detection mode, when the fifth clock signal is used to select the first antenna, the logic gate unit is configured to use the first and second clock signals to control the first charge switch/the first discharge switch to be off/on for discharge of the first capacitor, and then use the first and second clock signals to control the first antenna switch/the first charge switch/the first discharge switch to be on/on/off for detection of the first detection voltage through charge of the first capacitor.

10. The antenna diversity receiver of claim 8, wherein in the power detection mode, when the fifth clock signal is used to select the second antenna, the logic gate unit is configured to use the third and fourth clock signals to control the second charge switch/the second discharge switch to be off/on for discharge of the second capacitor, and then use the third and fourth clock signals to control the second antenna switch/the second charge switch/the second discharge switch to be on/on/off for detection of the second detection voltage through charge of the second capacitor.

11. The antenna diversity receiver of claim 10, wherein when the first detection voltage is higher than the second detection voltage, the power detector unit outputs is configured to output a signal for selection of the first antenna; and when the first detection voltage is equal to or lower than the second detection voltage, the power detector unit is configured to output a signal for selection of the second antenna.

12. The antenna diversity receiver of claim 11, wherein in the operation mode, the logic gate unit is configured to select and provide an output signal of the power detector unit to the first and second antenna switches of the antenna selector unit, so that on the basis of the output signal of the power detector unit, the logic gate unit controls the first antenna switch to select the first antenna when the first detection voltage is higher than the second detection voltage, and controls the second antenna switch to select the second antenna when the first detection voltage is equal to or lower than the second detection voltage.

* * * * *